United States Patent
Guldner et al.

(10) Patent No.: US 8,311,987 B2
(45) Date of Patent: Nov. 13, 2012

(54) DATA STAGING SYSTEM AND METHOD

(75) Inventors: Andreas Guldner, Überherrn (DE);
Felix Guldner, Überherrn (DE);
Hans-Jürgen Heßedenz, Saarwellingen
(DE); Thomas Kreiter, Schmelz (DE)

(73) Assignee: SAP AG, Walldorf (DE)

( * ) Notice: Subject to any disclaimer, the term of this patent is extended or adjusted under 35 U.S.C. 154(b) by 462 days.

(21) Appl. No.: 12/583,216

(22) Filed: Aug. 17, 2009

(65) Prior Publication Data

US 2011/0040737 A1    Feb. 17, 2011

(51) Int. Cl.
*G06F 7/24*    (2006.01)

(52) U.S. Cl. ........................................ 707/645

(58) Field of Classification Search .................. 707/646, 707/648, 645
See application file for complete search history.

(56) References Cited

U.S. PATENT DOCUMENTS

| | | | |
|---|---|---|---|
| 5,684,984 A | 11/1997 | Jones et al. | |
| 5,684,990 A | 11/1997 | Boothby | |
| 5,790,848 A * | 8/1998 | Wlaschin | 707/661 |
| 6,205,085 B1 | 3/2001 | Morgan et al. | |
| 6,424,970 B1 * | 7/2002 | Arakawa et al. | 707/999.007 |
| 6,449,622 B1 | 9/2002 | LaRue et al. | |
| 6,671,757 B1 | 12/2003 | Multer et al. | |
| 6,910,053 B1 | 6/2005 | Pauly et al. | |
| 6,941,184 B2 | 9/2005 | Ebert | |
| 7,162,543 B2 | 1/2007 | Fischer et al. | |
| 7,177,865 B2 | 2/2007 | Sasaki et al. | |
| 7,359,916 B2 | 4/2008 | Werner | |
| 7,490,108 B2 * | 2/2009 | Bruun | 707/999.2 |
| 7,783,549 B1 * | 8/2010 | Benson et al. | 705/36 R |
| 2006/0218206 A1 * | 9/2006 | Bourbonnais et al. | 707/202 |
| 2010/0064039 A9 * | 3/2010 | Ginter et al. | 709/224 |

* cited by examiner

*Primary Examiner* — Jorge A Casanova

(57) ABSTRACT

A data staging system comprises an inbound staging area, data conversion logic, and a graphical user interface. The inbound staging area is configured to receive data records from a data sending computer system, including being configured to receive different versions of the same record. The inbound staging area stores the different versions of the same record pending further processing. The data conversion logic is configured to perform the further processing. The further processing reduces the number of different versions of the same record. The graphical user interface logic is configured to generate a display showing the records in the inbound staging area.

17 Claims, 11 Drawing Sheets

DATA STAGING SYSTEM AND METHOD

BACKGROUND OF THE INVENTION

The same data is often stored at multiple locations. For example, a sending computer system (e.g., a master data system) may send data to a receiving computer system (e.g., a data consuming computer system that uses master data received from the master data system) to enable the receiving computer systems to perform various tasks (e.g., sales forecasting and so on).

Typically, such systems exchange data incrementally (i.e. exchange only changed attributes of an object). Sometimes, for example, during a remote function call made by the data receiving system, data that is sent by the master data system is never received by the receiving computer system. Consequently, the receiving computer system becomes out of synch with the sending computer system. Errors at the receiving computer system then need to be resolved to bring the receiving computer system back into synch with the sending computer system.

SUMMARY OF THE INVENTION

Example embodiments of the present invention relate to a data staging system that comprises an inbound staging area, data conversion logic, and a graphical user interface. The inbound staging area is configured to receive data records from a data sending computer system, including being configured to receive different versions of the same record. The inbound staging area stores the different versions of the same record pending further processing. The data conversion logic is configured to perform the further processing. The further processing reduces the number of different versions of the same record. The graphical user interface logic is configured to generate a display showing the records in the inbound staging area.

Example embodiments of the present invention relate to a method comprising receiving a record from a sending computer and processing the record at a receiving computer. The processing includes storing the record in an inbound staging table of an inbound staging area. The inbound staging table is one of a plurality of inbound staging tables in the inbound staging area. The record is one of a plurality of records stored in the plurality of inbound staging tables. Each of the plurality of records has a timestamp associated therewith. The processing further includes sorting the plurality of records in the plurality of inbound staging tables based on the timestamps and deleting older records. The processing further includes providing a graphical user interface to a user, the graphical user interface permitting the user to view details of messages in the inbound staging area.

BRIEF DESCRIPTION OF THE DRAWINGS

FIG. 5 shows a message type tree field of the connectivity workbench of FIG. 4 in greater detail.

1 FIG. 7 shows a message type detail field of FIG. 6 in which related sub-message types are also displayed.

FIG. 8 shows a sub-message type detail field for one of the sub-message types of FIG. 7.

FIG. 9 shows an exceptions field of the connectivity workbench of FIG. 4 in greater detail.

DETAILED DESCRIPTION OF EXAMPLE EMBODIMENTS

Figure 1:
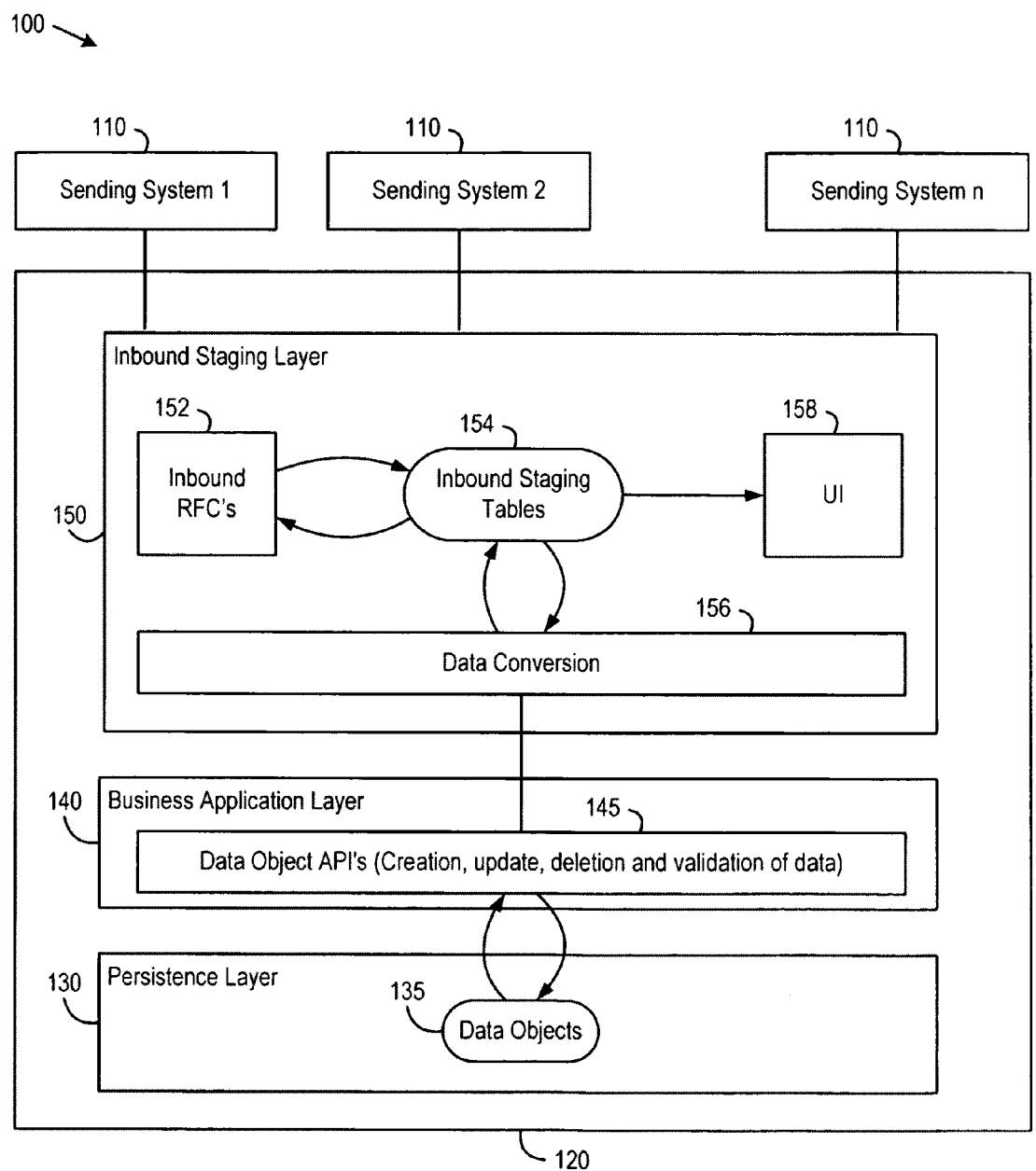
FIG. 1 is a data processing system in which a receiving computer system receives records from one or more sending computer systems according to an example embodiment.

Referring to FIG. 1, a data processing system 100 according to an example embodiment is shown. The data processing system 100 includes a plurality of sending computer systems 110 and a receiving computer system 120. The sending systems 110 may, for example, be master data systems and the receiving computer system 120 may, for example, be a data consuming computer system that uses master data received from the systems 110 to perform various tasks (e.g., sales forecasting and so on). For purposes of providing an example, it is assumed herein that the data relates to stores and to products sold by the stores at various locations. It is also assumed that the systems 110 and 120 are operated by the same entity, such that a user resolving errors may be assumed to have access to both systems 110 and 120. As will be appreciated, the data receiving systems 120 can also act as data sending systems 110, which send data to other data receiving systems. Other configurations are also possible.

In an example embodiment, the data records are transmitted in the form of service data objects. Each object that is sent comprises a unique key, a sender ID, and a key time stamp. The unique key uniquely identifies a data object and may comprise one or more segments. As described in greater detail below, the sender ID and the key time stamp enable more than one version of the same object to exist within the receiving system 120. The sender ID identifies the sending system 110, thereby permitting objects from different sending systems 110 to have the same identification (i.e., the same name). The key timestamp is a unique point in time, which identifies the sending date and time for the concerned object. The key timestamp may be a high resolution timestamp with multiple (e.g., six) decimal points of accuracy.

The sending systems 110 transmit data to the receiving system 120 using messages. The message for an object instance may comprise several parts including the object instance and dependant data. One part of the message is the main message of an object and the other parts are sub messages of an object. For example, the main message of a product object may contain a product identifier (e.g., product code or article number, etc) and a sub message of a product may contain the data for the different unit of measures. For example, in FIG. 4, discussed below, an example of a main message type may be location and examples of sub message types may be address data, hierarchy assignments, and text data. Thus, the unique key of the sub message of an object includes the key segments of the main message and additional following key segments for the sub message types. By modeling the description data of an object in such a way, it is possible to implement a generic and unified handling of different message types.

Each message that is sent by the sending systems 110 has a function code (I-insert, U-update, D-delete). When the data sending systems 110 transmit data for an object, the complete data record for the concerned object is sent (i.e., not just the changed attributes). Specifically, for insert and update operations, the sending system 110 sends the complete object instance (i.e., all the data of an object instance). For purposes of the receiving system 120, during inbound processing, the insert and update operations may be handled identically, although the sending system 110 may distinguish between the two types of operations. In the case that dependent data (e.g., unit of measure data) is sent, the complete data of an object instance (the data of the main message plus the dependent data for the unit of measure) is also sent. This only applies in cases where dependent data has changed. Thus, if data for one unit of measure has changed, but data for two other units of measure has not changed, then only the data of the main message and the data for the unit of measure that has changed is sent. For delete operations, it may be considered sufficient for the data sending system 110 to send only the object identifier, that is, the unique identification of an object instance. As will become apparent below, such full record processing permits data to be consolidated in the data receiving system 120, since the complete and current record is sent. Such full record processing also leads to a self-healing process for the data within the receiving system 120. That is, whenever a single field for an object of a failed data package is changed, all the data gaps of that object which might have been caused by missing data packages (e.g. due to remote function call errors) are eliminated without explicitly resending the missing packages.

The receiving system 120 further comprises a persistence layer 130, a business application layer 140, and an inbound staging layer 150. The persistence layer 130 stores data objects 135 accessed by business logic in the business application layer 140. The business application layer 140 comprises the business logic that operates on the data objects 135 stored by the persistence layer 130. The business application layer 140 further includes application programming interfaces 145 used to receive data from the inbound staging layer 150 and to communicate with the persistence layer 130. The business application layer 140 contains logic for creating, updating, deleting, and validating data received from the inbound staging layer 150.

The business application layer 140 distinguishes between insert and update operations, as previously noted. Hence, for an update record, it is checked (by the consuming business object) whether the object already exists. If it does exist, then it is a real update, otherwise it is an insert. Also, for an insert record it is checked (by the consuming business object) whether the object already exists. If it does exist, then it is an update, otherwise it is a real insert.

The inbound staging layer 150 is a data staging area that permits multiple versions of a data object to exist concurrently in the receiving system 120. The inbound staging layer 150 comprises inbound remote function calls 152, inbound staging tables 154, data conversion logic 156, and user interface logic 158. The remote function calls 152 receive incoming data from the data sending systems 110. The staging tables 154 are coupled to the remote function calls and store the incoming data. When the messages are received, the messages are appended to the inbound staging tables 154. The messages stored at each of the staging tables 154 may include different types of objects and different versions of the same object. Only inserts into the inbound staging tables 154 are performed (with the already mentioned high resolution time stamp field filled by the sending system). This timestamp represents the point in time of assembling changed object instances to a package. All object instances within a package will have a high resolution time stamp, as previously described. Additionally, two administrative fields are included with every data record in inbound staging tables 154. The first field is a Processing Status field, with possible values for the Processing Status field being not processed (N), error (E), and in process (P). The second field is a Processing Function field, with possible values for the Processing Function field being insert (I), update (U) and delete (D). When the data of an object is initially received, the data is stored in the inbound staging tables 154 without any validation. The data of an object is checked and validated during the data storage process which is triggered by the data conversion.

The data conversion logic 156 packages and compresses the objects stored in the inbound staging tables 154 to produce business objects for the business application layer 140. The operation of the data conversion logic 156 is discussed in greater detail below in connection with FIGS. 2-3. The user interface logic 158 provides a user with a monitor view into the inbound staging layer 150. The user interface logic 158 is described in greater detail below in connection with FIGS. 4-11.

In the arrangement described above, it is not necessary to read existing interface records during inbound processing. Additionally, the inbound history of objects is stored until the next processing of data, facilitating manual error processing as discussed below. Additionally, data import (mere inserts into interface tables) is decoupled from data processing into application database tables (Business Objects (BO)). Additionally, there is improved data consistency, because the full record processing eliminates all the data gaps of that object which might have been caused by missing data packages (e.g. due to remote function call errors) without explicitly resending the missing packages. For the same reason, error processing is simplified, because data inconsistencies do not have to be reported to the sender.

Figure 2:
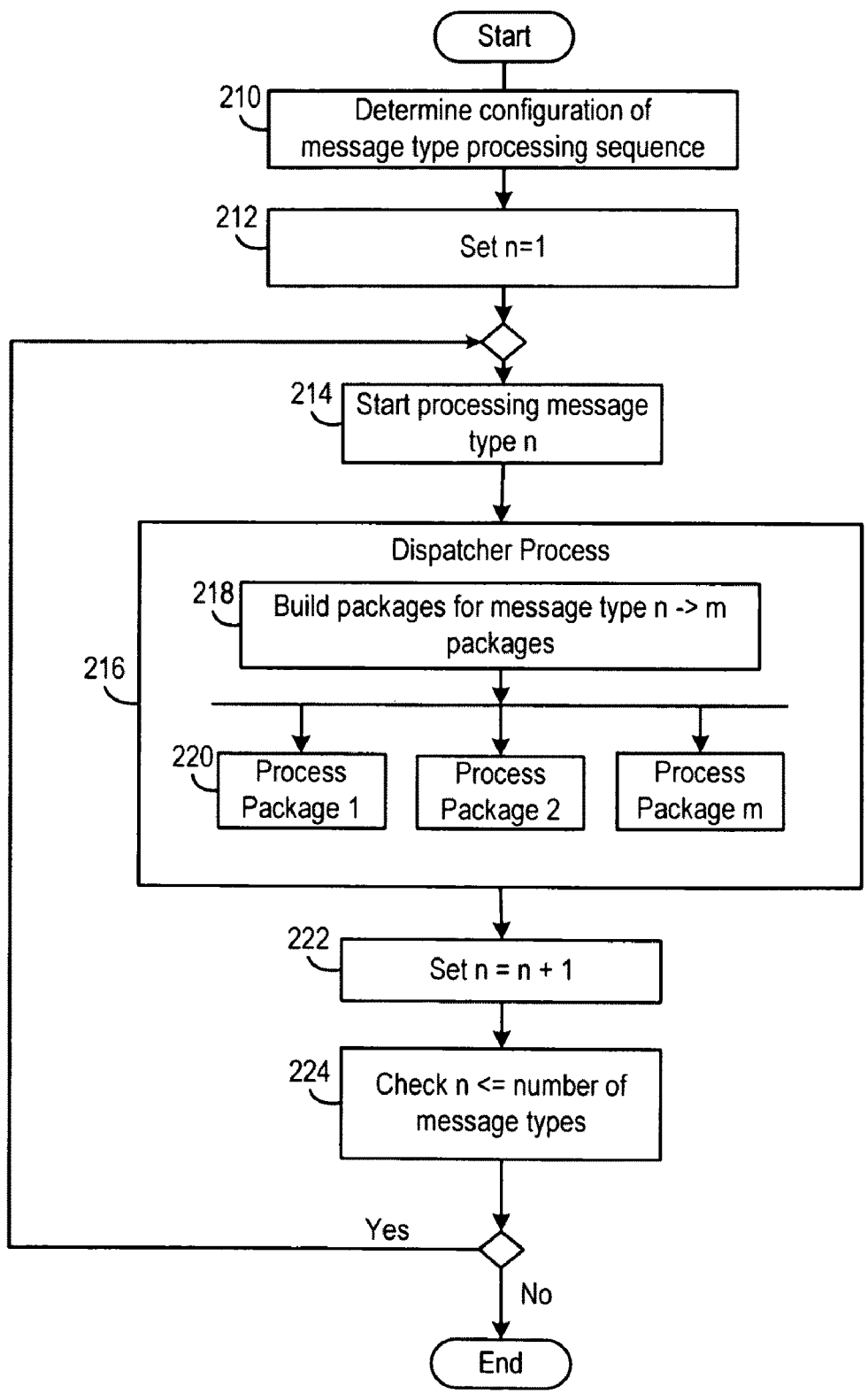
FIG. 2 is a flowchart showing a packaging algorithm applied to inbound records in the system of FIG. 1.

Referring now to FIG. 2, FIG. 2 is a flowchart showing processing of inbound records in the system of FIG. 1. As previously noted, the messages stored at each of the staging tables 154 may include different types of objects and different versions of the same object. FIG. 2 shows the processing data from the staging tables 154 into the corresponding business objects. In the process of FIG. 2, packages are built for each message type. Each package corresponds to one message type, so that all of the messages (including sub messages) for a given object are contained in one package. For example, with reference to FIG. 4, if the main message type is "locations" and the sub message types are "address data," "hierarchy assignments," and "text data," there is one package built that contains the messages for the main message and sub message types. Further, all records for the same object are processed within the same package, though not necessarily all objects of the same message type are processed within the same package. For example, if there are five locations (A, B, C, D and E), and if for every location there exists three update entries in the staging tables 154 for the main object (location), then there are fifteen total messages (A1, A2, A3, B1; B2, B3, C1, C2, C3, D1, D2, D3, E1, E2, E3) in the staging tables 154. However, all fifteen messages are not necessarily processed in the same package (e.g., A1, A2, A3, B1; B2, B3, C1, C2, and C3 may be processed in one package and D1, D2, D3, E1, E2, E3 may be processed in another package). Hence, there may be more than one package for a particular message type. Again, if there are additional sub messages (e.g., A1(*a*), A1(*b*) and A1(*c*) corresponding to address data, hierarchy assignments, and/or text data for location A), the sub messages are processed within the same package as the update entries (A1, A2, A3) in the staging tables 154 for the main object (location) for location A.

At step 210, a configuration of the message type processing sequence is determined. The processing of the different message types in the different inbound staging tables 154 into the respective business objects is performed in a predefined sequence. For example, it may not be possible to process a product location object for a non-existing location object or a non-existing product object. Determining the correct sequence permits such object dependencies to be taken into account.

The configuration of the message type processing sequence may be determined by accessing a configuration table which stores the correct sequence. For every inbound message type, the configuration table holds a sequence number which defines the order of processing of the message types.

At steps 212-224, the processing of the different inbound staging tables 154 into the respective business objects is performed. The processing is controlled by a supervising process. The supervising process reads the information from the configuration table and starts corresponding processes 1 ... m as parallel tasks, where m is the maximum number of available tasks for parallel processes. The parallel processes may be used to process different objects of the same message type (e.g., objects for different locations A, B, C, D and E in the above example). Likewise, the parallel processes may also be used to process objects from another message type which have the same sequence number (e.g. location and product). At steps 218-220, each parallel task performs a package building on the corresponding records of the main message type by assigning a sequence number 1 ... P to every record within the inbound staging table 154, where P is the number of different message types. After having assigned sequence numbers 1 ... P to every record within the inbound staging table 154, these sequence numbers are provided (together with the message type) to a dispatching process, which takes over the control for processing the corresponding message type. This dispatching process starts the parallel processes (which are responsible for processing the data from the inbound staging tables 154 into the corresponding business objects) by assigning every process the message type and a sequence number from the set 1 ... P of sequence numbers. This process iteratively proceeds through each message type in the sequence (steps 212, 214, 222, and 224) until the last message type is reached (step 224).

Whenever interface processing for a message type (object) is started, it is ensured that all interface records for this message type are processed regardless of their processing status (i.e. not only new records but also error records are also read). With the approach of appending records to fill the interface tables (instead of update), there can be an error record (for example) and one or more new records for the same object. All records are considered together, i.e., error records are not ignored when the next interface inbound processing run is started.

Also, as previously indicated, all records for the same message type object are condensed and processed within the same task to avoid inconsistencies. Therefore, if the currently processed staging table still contains more records and it is necessary to create further package(s), the records for the last message type object are processed in the next package. Thus, while all records for the same object may be processed within the same package, all objects of the same message type are not necessarily processed within the same package. For example, if there are five locations (A, B, C, D and E), and if for every location there exists three update entries in the staging tables 154 for the main object (location), then there are fifteen total messages (A1, A2, A3, B1; B2, B3, C1, C2, C3, D1, D2, D3, E1, E2, E3) in the staging tables 154. If the maximum package size is ten, for example, then the first nine entries (A1, A2, A3, B1; B2, B3, C1, C2, C3) are placed in the first package. When the next entry (D1) is read, it is placed into the next package to accommodate the fact that there may be (and, in fact, are in this example) additional entries for location D. By placing D1 in the next package, it is ensured that have to put it into the next package to make sure, that D1, D2 and D3 are processed together. As a consequence of this the number of processed objects N is always lower or equal the package size S, i.e. N<=S. The total number of needed packages (P) can be calculated as follows:

$$P = \text{round}(T/S) + 1.$$

where T is the total number of records within a database table and S is the package size.

Figure 3:
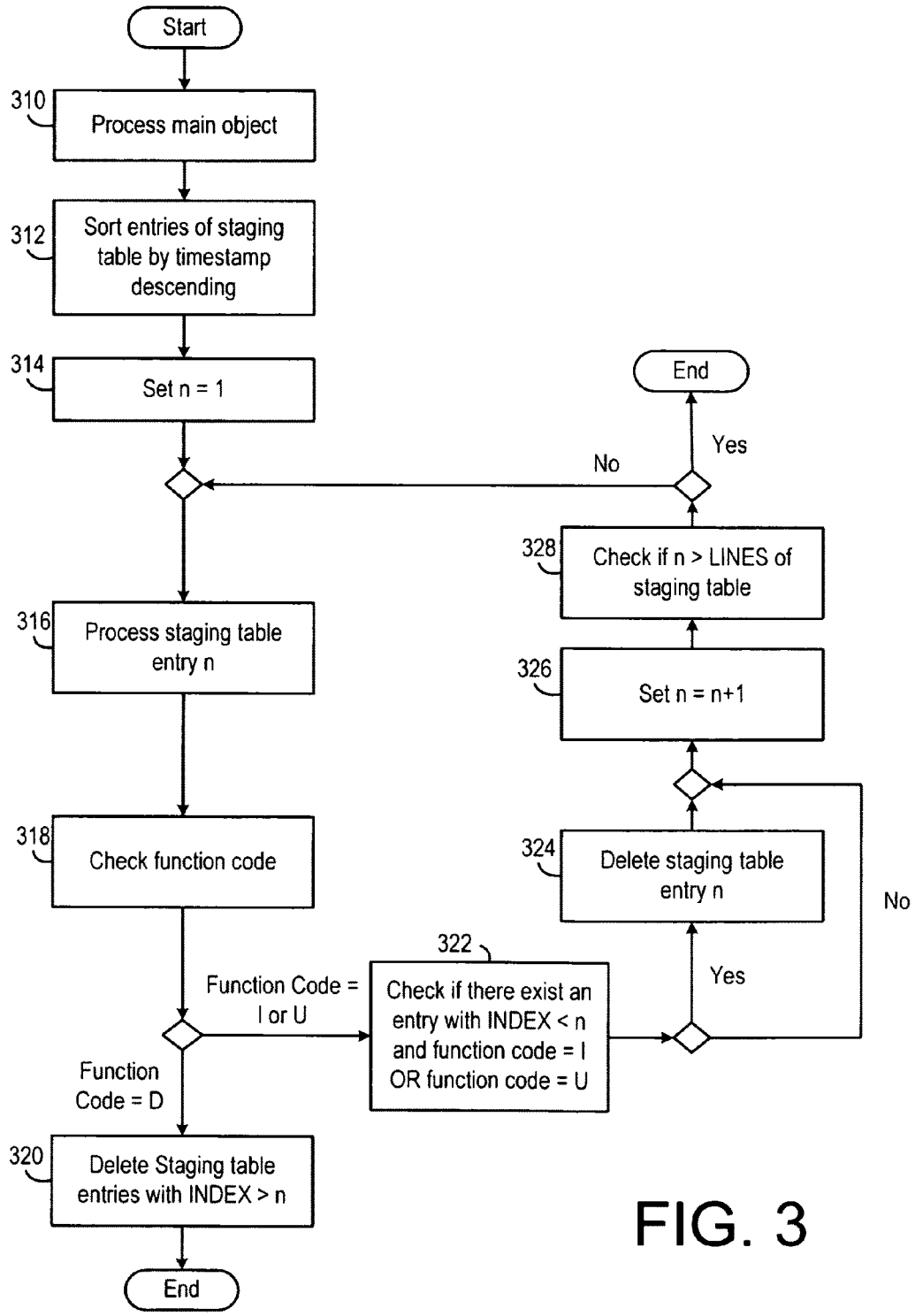
FIG. 3 is a flowchart showing a compression algorithm applied to inbound records in the system of FIG. 1.

Referring now to FIG. 3, FIG. 3 is a flowchart showing a compression algorithm applied to inbound records in the system of FIG. 1. The compression algorithm is applied after the process shown in FIG. 2. As previously indicated, the staging tables 154 may contain several records for the same object key with different high-resolution time stamps. These records can be set to different function codes, e.g. a DELETE can follow on an UPDATE function code. To avoid unnecessary operations, it is desirable to condense all records for the same objects to one record for the call business object layer, considering all records for the message type.

In case of mere insert and update records, the merge logic during the processing of the interface records can be a simple sort by object key (i.e. the logical key of a record) and time stamp. It is sufficient to post the most recent (header) record of an object to the receiving business object. The dependent records that are linked to the main object are considered all together and may be posted together with the main record. The merging of dependent interface records consists of collecting the dependent data. (In the case of an error during processing of a main record which results in processing status 'E', the processing status 'E' is attached to all dependent data of this main record.) The actual merge is performed afterwards within the receiving business objects.

The process of FIG. 3 is applied to a single inbound staging table 154 and repeated for each of the inbound staging tables 154. At step 310, the main object is processed. At step 312, the entries of the staging table 154 are sorted by time stamp and object key. At steps 314-328, the following merge and consolidation logic (for the main records) applies for the point in time t1 and t2 (t2>t1):

t1: Insert/Update, t2: Delete→processing step: Delete
 t1: Delete, t2: Insert/Update→processing steps: Delete, then Insert Hence, when the function code is checked at step 318, the process then proceeds to either step 320 or step 322. If the function code is "Delete," then all of the remaining (older) entries in the inbound staging table 154 for that message type are deleted at step 320. If the function code is "Insert" or "Update," then a check is made whether there are any (newer) entries in the inbound staging table 154 for that message type which also have a function code of "Insert" or "Update" at step 322. If so, then that entry in the staging table is deleted (step 324), since it will be proceeded by a more recent entry. Otherwise, that entry in the staging table is retained. This process proceeds iteratively until the end of the staging table is reached (step 328). In subsequent iterations, once a point is reached where there are no newer entries in the inbound staging table 154 for that message type which also have a function code of "Insert" or "Update" (step 322), then all remaining entries in the staging table are deleted through repeated performance of step 324. Alternatively, once a point is reached where the function code "Delete" is reached (step 318), then all remaining entries in the staging table are deleted at step 320.

In the case that there is a deletion record which is followed by an insert/update record, the consuming business object insures that the dependent data is actually deleted before an insert of the new data for the same object instance is performed.

After the processing of the interface tables, the inbound staging tables 154 are cleaned up depending on the result of the interface processing of each record. For example, successfully processed records are deleted from the inbound staging tables 154. In case an error occurs, the (consolidated) interface record for the associated object is set to status 'E' and no deletions occur. This allows identification of those objects that could not be updated. Assigned error messages may provide hints on how to adjust certain data inconsistencies which prevented the data from being posted (e.g. certain missing master data that are mandatory for the corresponding object). (A corresponding user interface is described below in connection with FIGS. 4-11.) The 'E'-objects are picked up during the next interface processing run (due to automatic processing of error records).

Basic error handling may be included. For example, whenever a message type is processed, the interface error record(s) of the associated message type are considered in each follow up processing step. Hence, if a record for an object has status 'E' (error), it is read and processed automatically whenever new records for the same message type are processed. Thus, if errors exist for some records or for dependent objects of some records, the inbound staging layer 150 creates error messages for such records and sets the processing status of the records to 'E' (error). The records with errors then remain in the staging tables 154. During the next inbound process for a message type, all the entries in the staging tables 154 for this message type with processing status new and erroneous are processed. For example, if an error occurs during the processing of a dependent object, then a subsequent update of the dependent object will either correct the error or encounter the same error thereby leading to a new error message. In the latter scenario, the processing type of the new staging table entry is set to 'E' (error) again. The first staging table record which has caused the first error is deleted, because it is condensed with the new record during processing. Thus, the error messages and the processing state reflects the current status for the staging table entries. Processing the records with errors brings them into a consistent state and minimizes the risk that old data may overwrite more recent data.

Referring now to FIGS. 4-11, the user interface provided by user interface logic 158 for the inbound staging layer 150 is shown in greater detail. Specifically, FIGS. 4-11 show a connectivity workbench provided by a user interface logic 158 in the system of FIG. 1. The processing of messages in the inbound staging layer 150 is initiated responsive to manual inputs received from a user. When the workbench is started, the number of entries in each respective inbound staging table 154 is determined. The user interface permits a user to supervise and control the data flow through the inbound staging layer 150.

Figure 4:
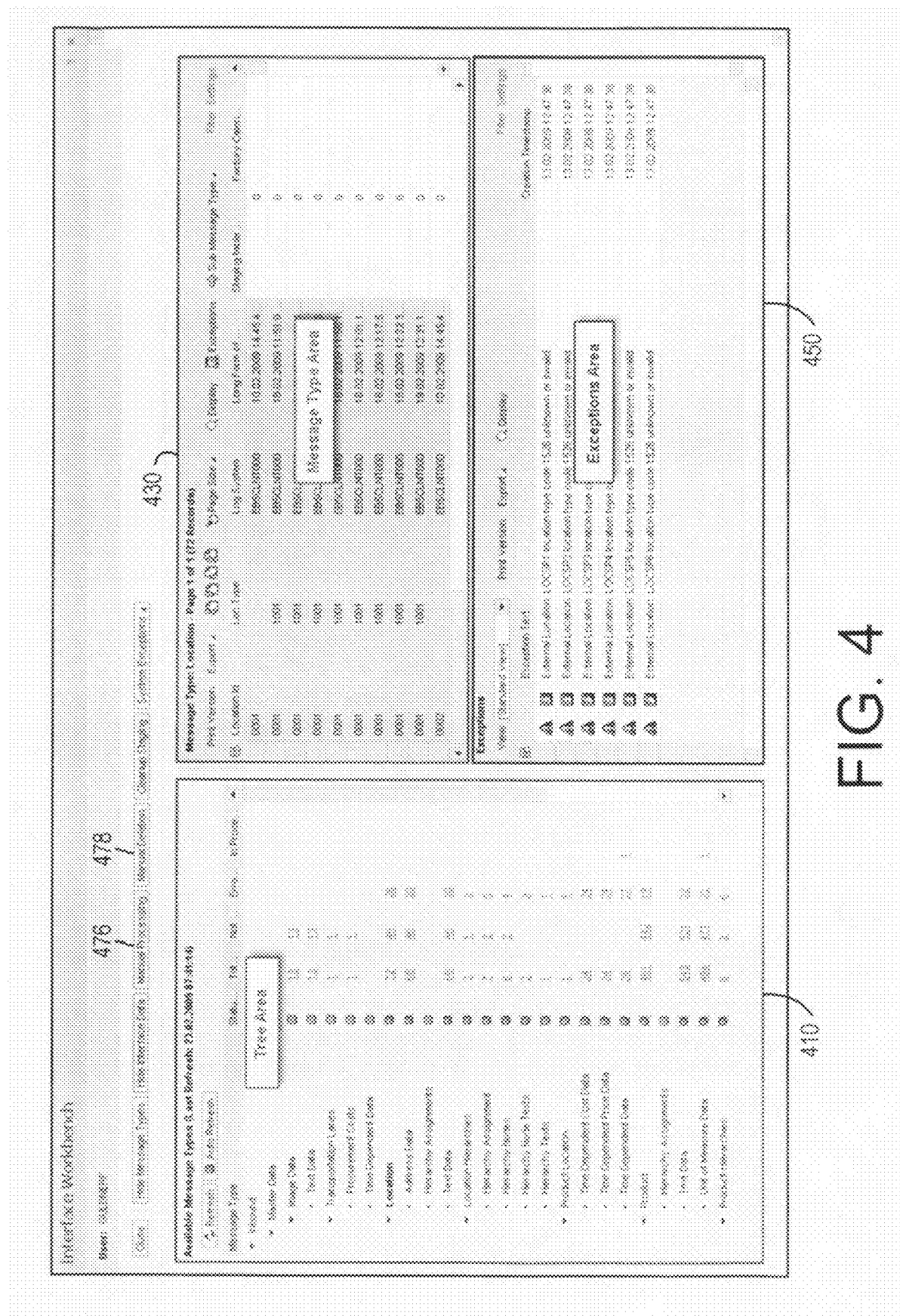
FIG. 4 is a screen display showing a connectivity workbench provided by a user interface in the system of FIG. 1.

Referring first to FIG. 4, in the screen display of FIG. 4, the user is provided with an overview of the messages in the inbound staging layer 150. The display comprises field 410, field 430, and field 450, which are shown in greater detail in FIG. 5, FIG. 6, and FIG. 9, respectively.

Figure 5:
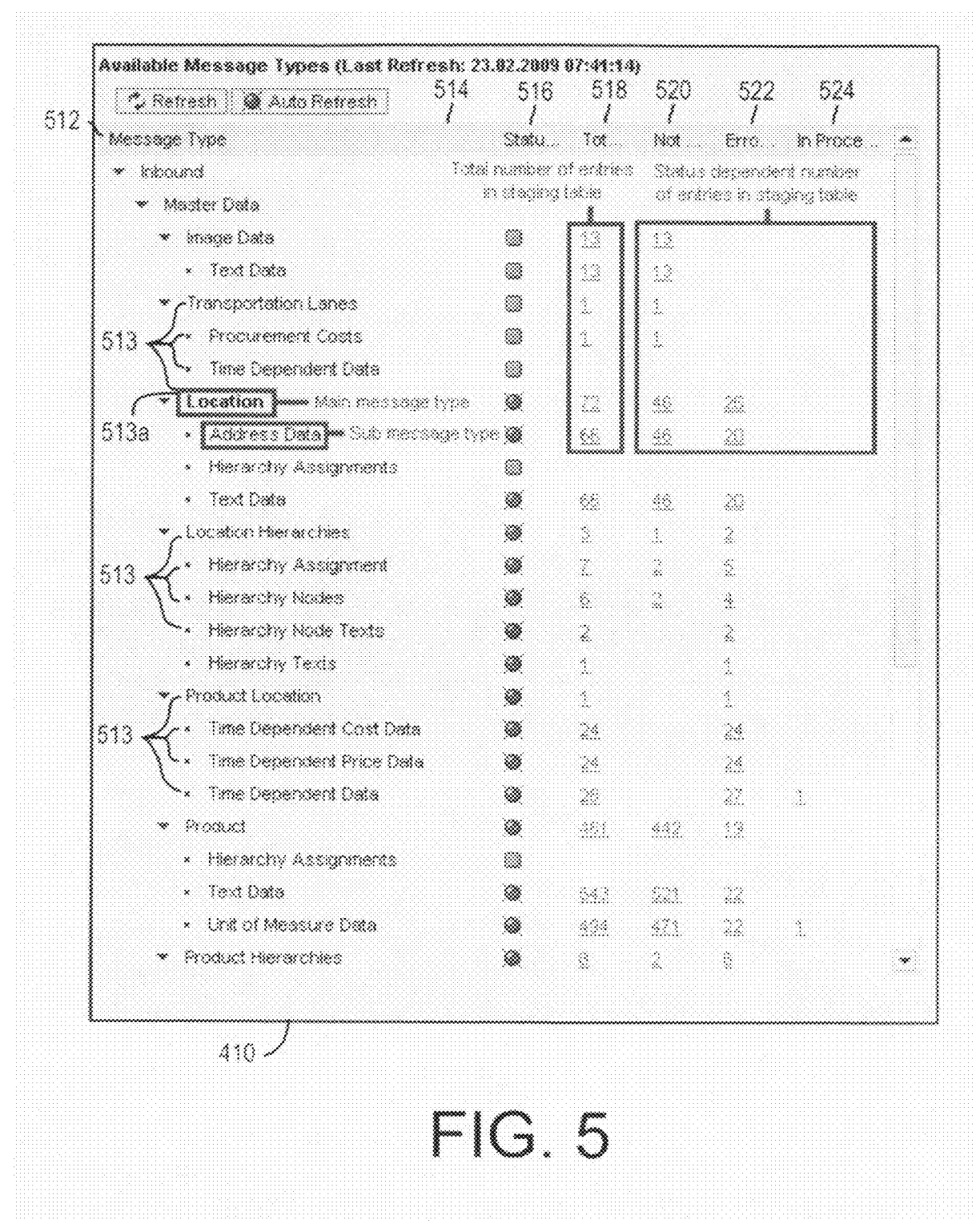

Referring now to FIG. 5, FIG. 5 shows message type tree field 410 of the connectivity workbench of FIG. 4 in greater detail. Field 410 comprises a table 512 in which each row 513 corresponds to a different message type or sub message type for messages stored inbound staging layer 150. Column 514 indicates the message type shown in a particular row. Column 514 is displayed as a tree broken out into various message and sub-message types. As previously described, a configuration table (not shown) stores the message types for the inbound staging layer 150. For each message type, column 516 indicates error status (i.e., whether any messages have errors), column 518 indicates the total number of messages of that message type, column 520 indicates the total number of messages that have not been processed, column 522 indicates the total number of messages with errors, and column 524 indicates the total number of messages that are currently being processed. The indicators in column 516 may be color coded, for example, based on whether any messages of that message type have errors (i.e., a non-zero value in column 522).

To display more information about a specific message type 513a, the user may click on information in the respective row for the message type 513 (e.g., the total number of messages in column 518 or a status dependent number in columns 520-524). When the user selects a specific message type 513a, field 430 in FIG. 4 is built according to the structure of the staging table 154 for the selected message type and filled with the content of the staging table 154.

Figure 6:
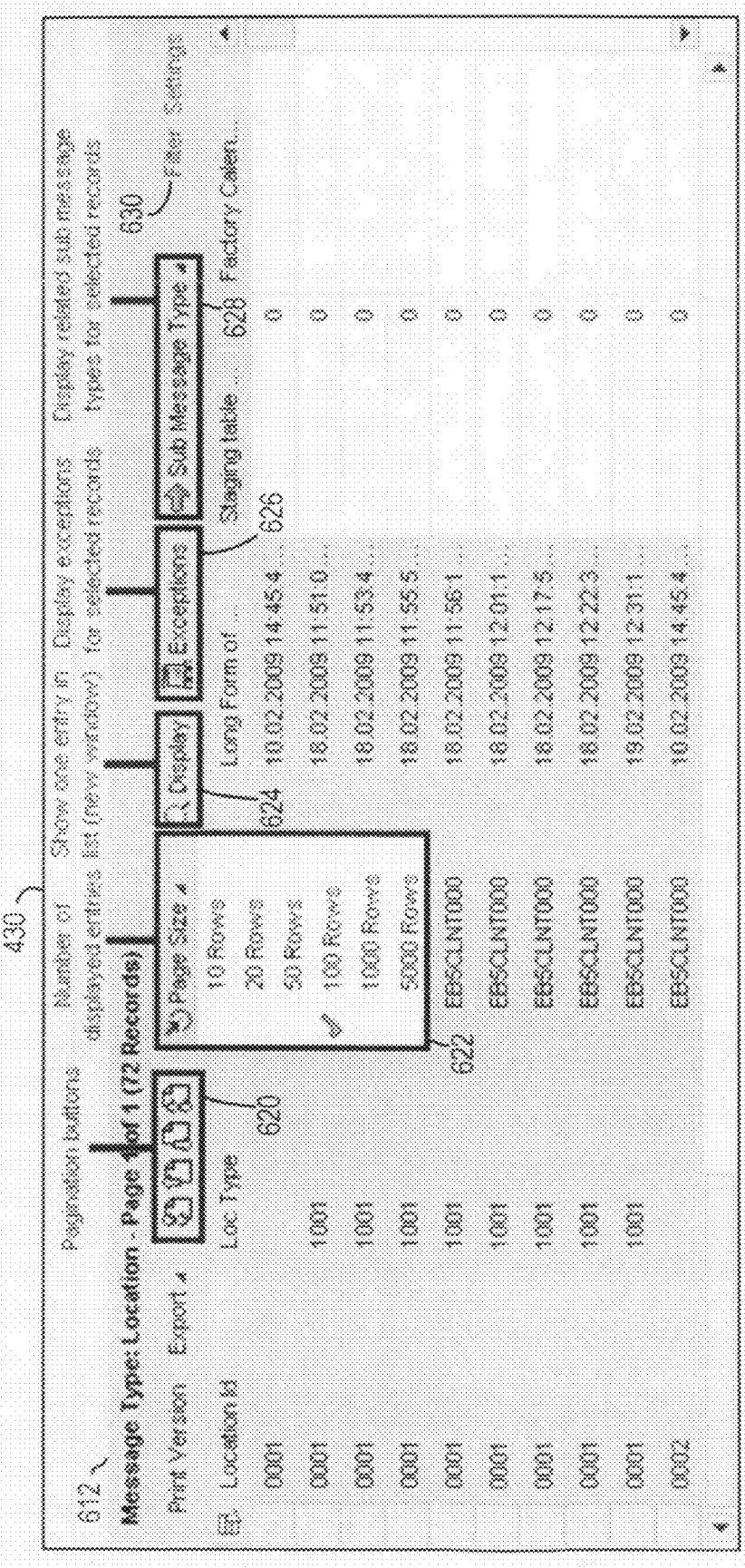
FIG. 6 shows a message type detail field of the connectivity workbench of FIG. 4 in greater detail.

Referring now to FIG. 6, FIG. 6 shows message type detail field 430 of the connectivity workbench of FIG. 4 in greater detail. Field 430 comprises a table 612 showing details of messages of the selected message type. Various buttons and tools 620-630 are provided for manipulating the display and the information that is displayed. The number of entries on one page of the display may be limited to enhance performance. Buttons 620 permit the user to page forward or backward on the display. Cursor 622 permits the page size to be changed. A display button 624 causes a new window to be opened, where the data of a selected record is displayed in a list. Buttons 626 and 628 permit additional information about exceptions and sub messages to be displayed, as described below. A sort and filter tool 630 permits the user to sort entries of the table by a single field and specify filters (e.g., up to ten different parallel filters may be applied at one time). By using range tables for the filter handling, wildcards (*) are also possible. Sort and filters always are applied to all entries of the database staging table (status will also be mentioned), not just to the displayed ones (i.e., the filter is not applied at the front end, but rather at the back end).

Figure 7:
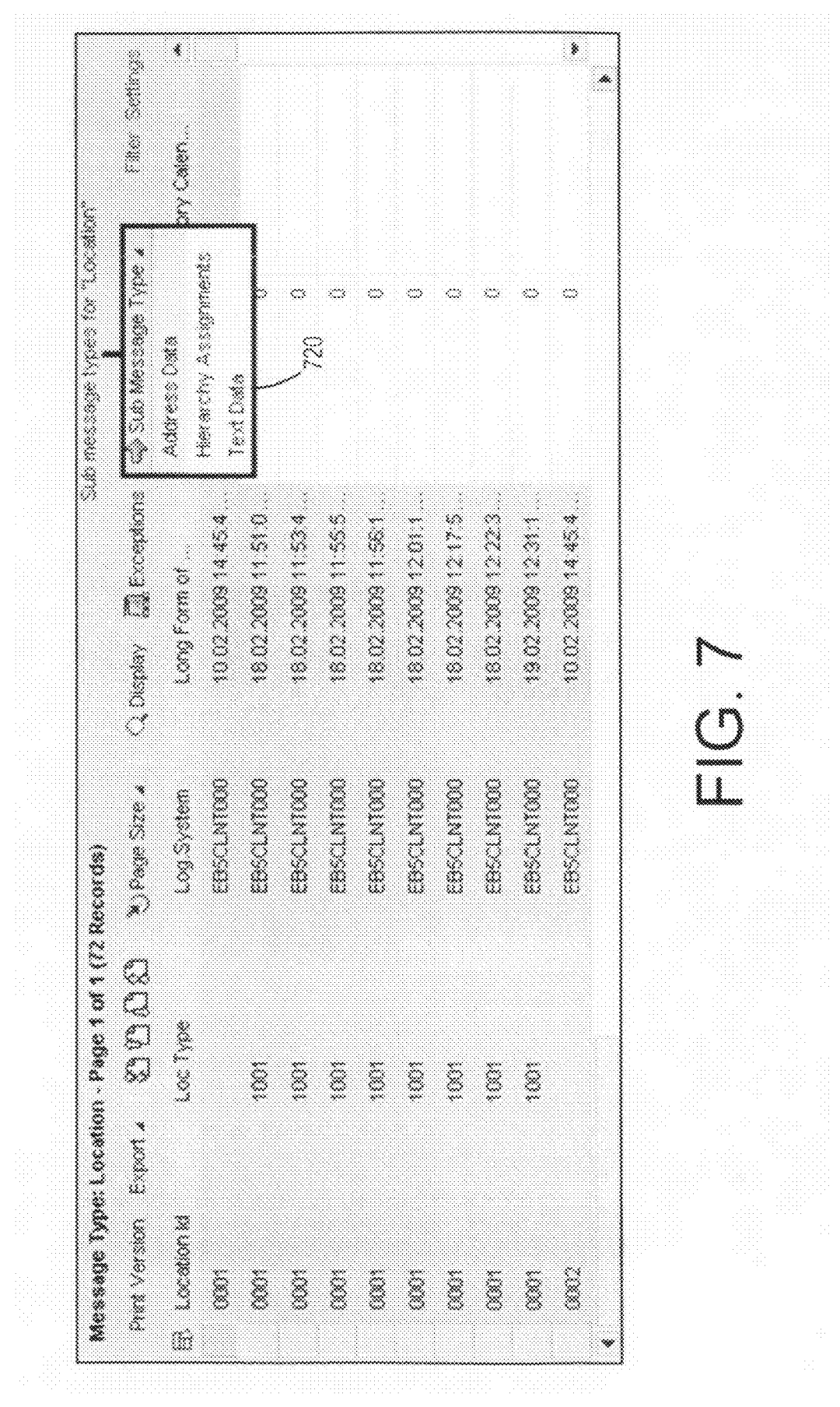

FIG. 7 shows a message type detail field of FIG. 6 with related sub-message types also displayed in a drop down window 720. The drop down window 720 appears when a message type is selected that has sub message types and the user selects button 618 in FIG. 6. The sub-message types in FIG. 7 correspond to those for the message type selected in FIG. 5. This arrangement provides the option to display the related sub messages for specific records by selecting them and choosing the respective entry in the dropdown menu.

Figure 8:
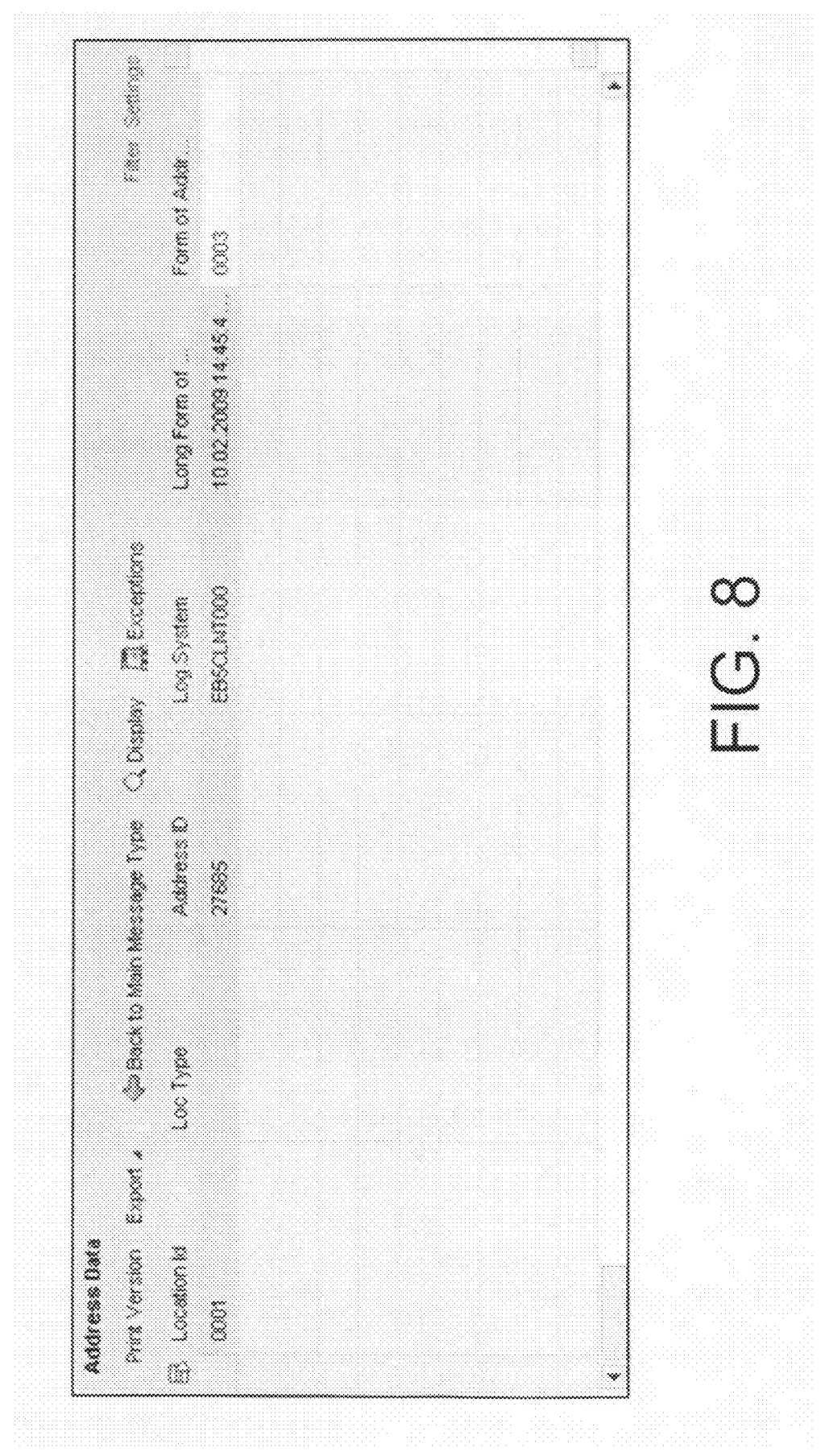

FIG. 8 shows a sub-message type detail field for one of the sub-message types of FIG. 7. After the user selects one entry of the related sub message type submenu ("address data" in FIG. 7), the related sub messages of the selected main messages are displayed in the new table shown in FIG. 8.

Figure 9:
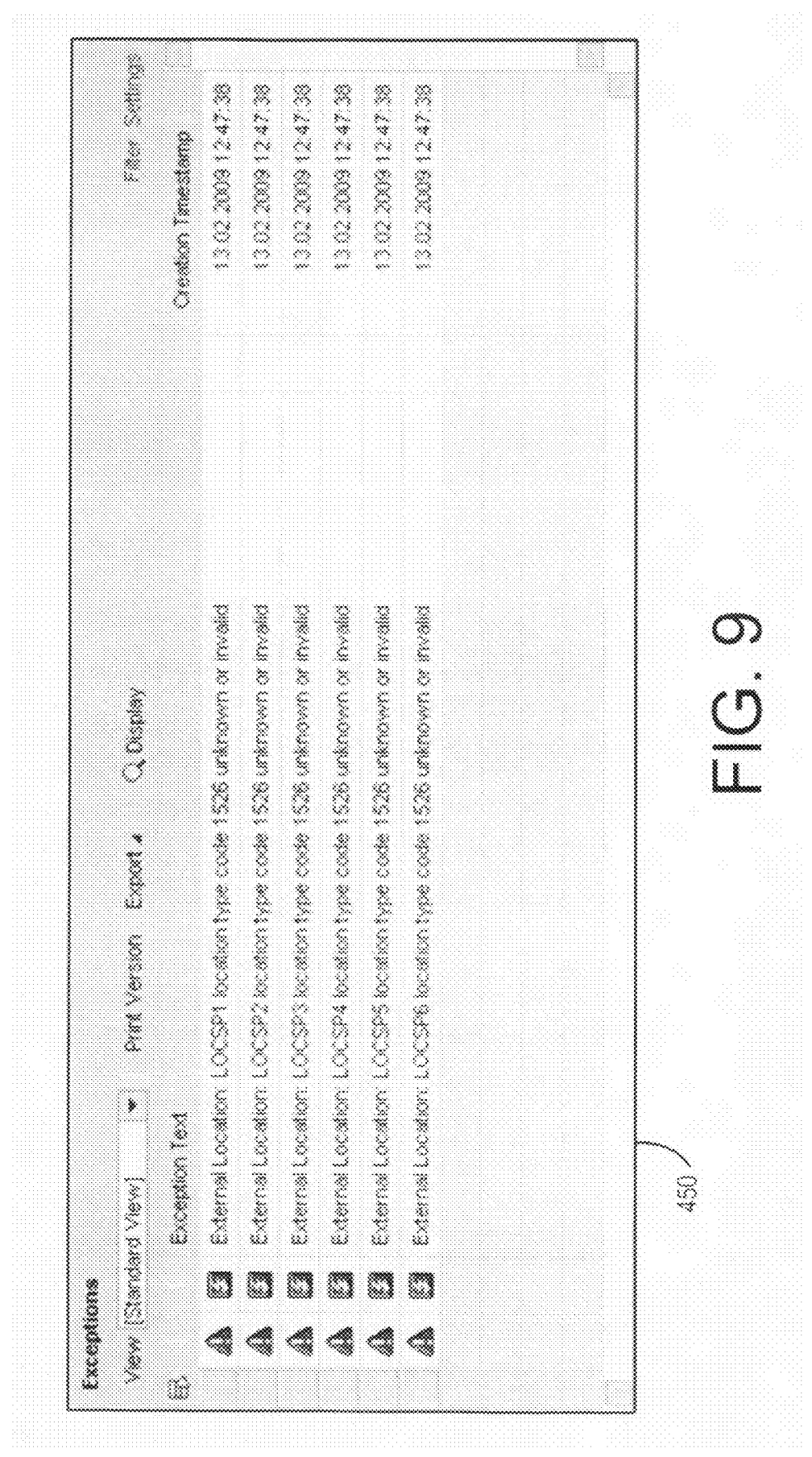

FIG. 9 shows an exceptions field of the connectivity workbench of FIG. 4 in greater detail. The exceptions shown in FIG. 9 are for a selected one of the displayed entries in FIG.

8. If exceptions exist for the selected entry, the exceptions are shown in the table in FIG. 9. Accordingly, the "scrolling" in the upper table also affects display of the "Exceptions"-Table. Additionally, only the exceptions for some specific records are displayed by selecting them in the upper table and pressing the "Exceptions" button.

Figure 10:
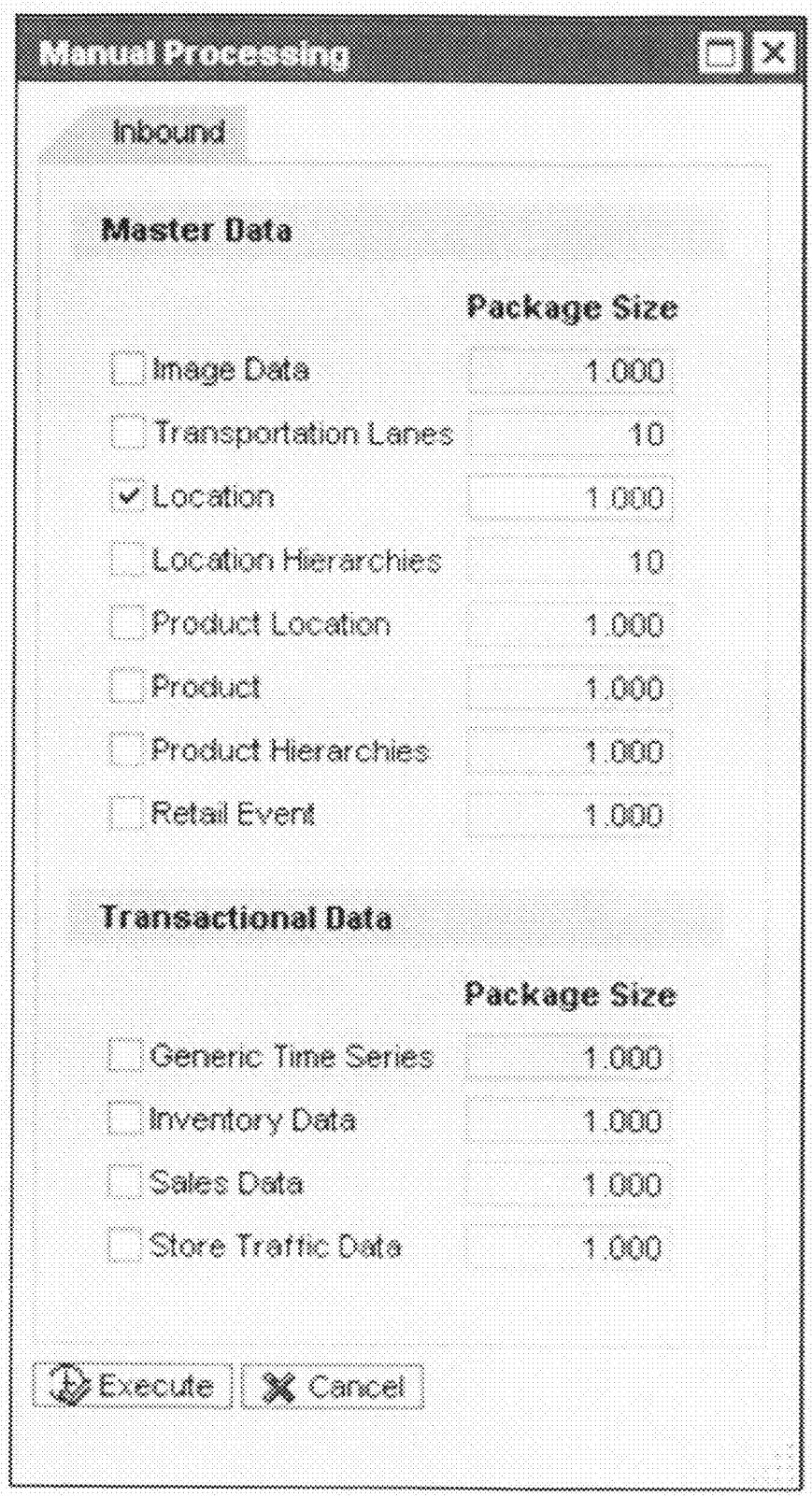
FIG. 10 is a display provided to a user responsive to the user selecting a manual processing option in the connectivity workbench of FIG. 4.

FIG. 10 is a display provided to a user responsive to the user selecting a manual processing button 476 in the connectivity workbench of FIG. 4. When the user selects the manual processing button 476, a new window is opened (FIG. 10), where the user can select the available message types (only main message types) to be processed.

Figure 11:
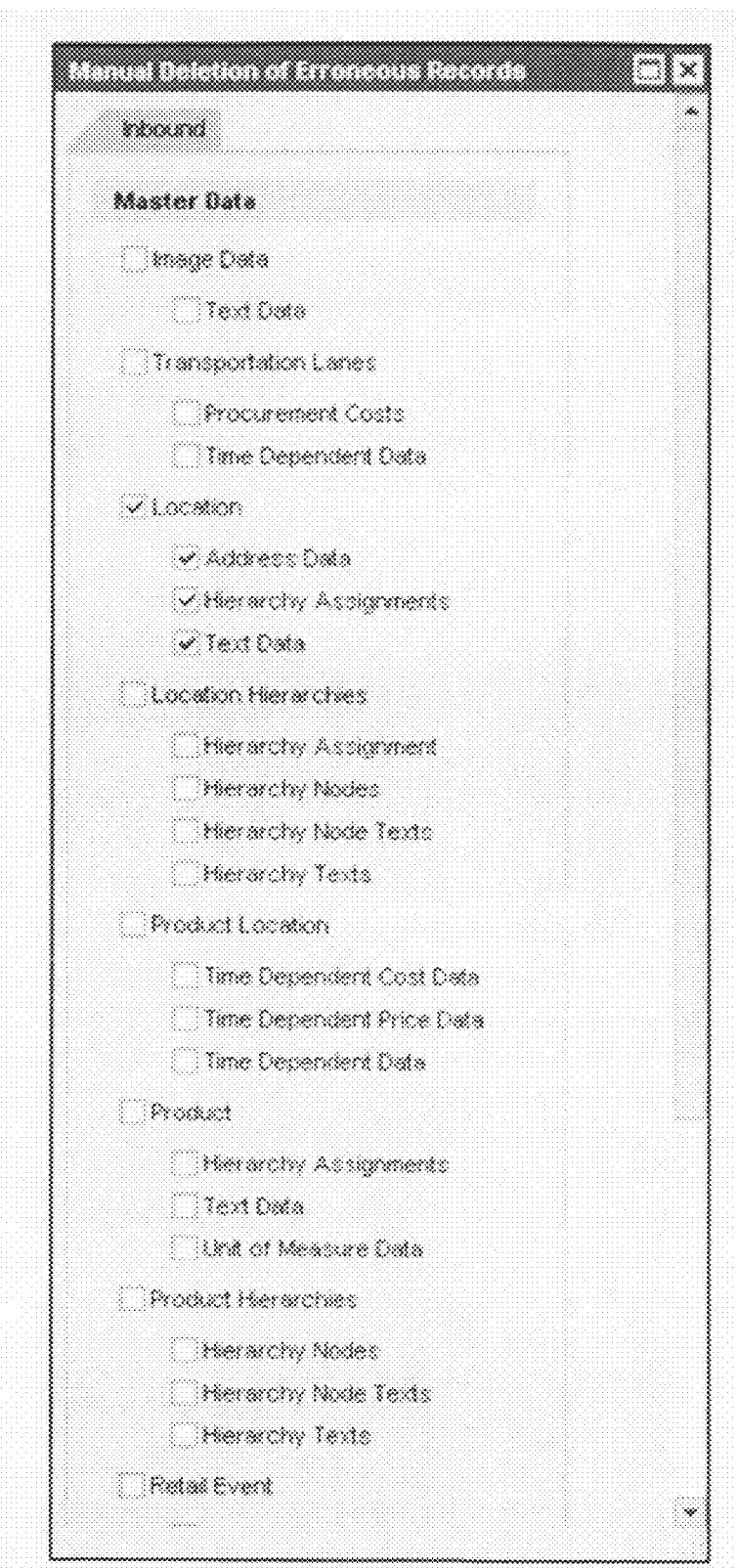
FIG. 11 is a display provided to a user responsive to the user selecting a manual deletion option in the connectivity workbench of FIG. 4.

FIG. 11 is a display provided to a user responsive to the user selecting a manual deletion button 478 in the connectivity workbench of FIG. 4. When the user selects the manual deletion button 478, a new window is opened (FIG. 11), where the user can select the available message types (including sub message types), for which the erroneous records shall be deleted in the staging table.

The user interface logic 158 is generic and can handle new message types. When enhancing the inbound staging layer 150 with a new message type, it is not necessary to enhance (rework) the user interface logic 158. All dialogs of the user interface logic 158 are dynamically rendered. All underlying needed structures (e.g. for displaying different tables) are created at runtime. There exists one central configuration table, which holds all needed information for a message type. Whenever new message types have to be considered within the inbound staging layer 150, only additional entries into the configuration table are necessary.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. Non-transitory computer-readable media having program code stored therein executable by one or more processors to implement a receiving computer system, the receiving computer comprising:
    an inbound staging area, the inbound staging area being configured to receive data records as data objects from one or more data sending computer systems with each data object having information that enables multiple different versions of same data objects to exist within the receiving computer, the inbound staging area being further configured to receive multiple different versions of the same data objects and to store the multiple different versions of the same data objects based on the information pending further processing;
    data conversion logic, the data conversion logic being configured to perform the further processing, the further processing being configured to reduce the number of multiple different versions of the same data objects by packaging and compressing the received data objects including the multiple different versions of the same data objects based on the information, wherein the data conversion logic is configured to create packages of data objects, each package comprising the multiple different versions of the same data objects for different types of data records, and wherein the data conversion logic is further configured to sort the multiple different versions of the same data objects, and wherein the data conversion logic is further configured to initiate the creation of the packages and the sorting of the multiple different versions of the same data objects; and
    graphical user interface logic, the graphical user interface logic being configured to generate a display showing the records in the inbound staging area.

2. Computer readable media according to claim 1 wherein, whenever data for a data object is received by the inbound staging area, a complete data record for the data object is received.

3. Computer readable media according to claim 1, wherein the data conversion logic is configured to sort the multiple different versions of the same data objects based on a timestamp.

4. Computer readable media according to claim 3, wherein the data conversion logic is configured to initiate the creation of the packages and the sorting of the multiple different versions of the same data objects based on a manual input received from a user.

5. Computer readable media according to claim 1, wherein the data records are received in messages, and wherein the display shows message types organized in a table, including the number of multiple different versions of each data object.

6. Computer readable media according to claim 1, wherein graphical user interface logic is further configured to generate a display that provides options to a user for manually processing data records.

7. Computer readable media according to claim 1, wherein graphical user interface logic is further configured to generate a display that provides options to a user for deleting data records and data objects including multiple different versions of the same data objects.

8. Computer readable media according to claim 1, wherein the graphical user interface logic is further configured to generate a display showing an inbound history of the data records in the inbound staging area.

9. A method comprising:
    receiving a record from one or more data sending computers, the record being received at a receiving computer;
    processing the record at the receiving computer, including:
        storing the record in an inbound staging table of an inbound staging area, the inbound staging table being one of a plurality of inbound staging tables in the inbound staging area, and the record being one of a plurality of records stored in the plurality of inbound staging tables, each of the plurality of records having a timestamp associated therewith that enables multiple different versions of same records to exist within the inbound staging area, sorting the plurality of records in the plurality of inbound staging tables based on the timestamps and reducing the number of multiple different versions of the same records by deleting one or more older records based on the timestamps;
    maintaining a configuration table, the configuration table storing information that defines an order in which types of records are sorted during the sorting; and
    providing a graphical user interface to a user, the graphical user interface permitting the user to view details of messages in the inbound staging area.

10. A method according to claim 9, wherein the records are data objects and are received as messages.

11. A method according to claim 9, wherein each message is assigned a unique key, a key timestamp, and a sender identification.

12. A method according to claim 9, wherein the records are data objects and wherein, whenever data for a data object is received by the inbound staging area, a complete data record for the data object is received.

13. A computer-implemented data processing system comprising:

one or more sending computer systems, each of the one or more sending computer systems having at least one processor being configured to send data records for a plurality of different types of data objects;

a receiving computer system, the receiving computer system having at least one processor being configured to receive the data records from the one or more sending computer systems by way of a computer network with each data record having information that enables multiple different versions of same data records to exist within the receiving computer system, the receiving computer system including an inbound staging layer executable by the at least one processor, the inbound staging layer further including inbound staging tables, the inbound staging tables being configured to store the data records pending further processing, including being configured to receive multiple different versions of the same data records and to store the multiple different versions of the same data records pending further processing, wherein each new data record received is appended to an inbound staging table, data conversion logic executable by the at least one processor, the data conversion logic being configured to perform the further processing, including being configured to create business objects by packaging data records from different ones of the inbound staging tables into respective packages having multiple different versions of the same data records, sorting the data records, and deleting older versions of the same data records based on the information, graphical user interface logic executable by the at least one processor, the graphical user interface logic being configured to generate a display showing the data records in the inbound staging layer;

a business application layer, the business application layer being configured to receive the business objects from the inbound staging layer and to validate the business objects; and a persistence layer, the persistence layer being configured to store the business objects.

14. A system according to claim 13 wherein, whenever data for a data object is received by the inbound staging area, a complete data record for the data object is received.

15. A system according to claim 13, wherein the display shows message types organized in a table, including the number of multiple different versions of each data record.

16. A system according to claim 13, wherein graphical user interface logic is further configured to generate a display that provides options to a user for manually processing data records.

17. A system according to claim 13, wherein the graphical user interface logic is further configured to generate a display showing an inbound history of the data records in the inbound staging area.

* * * * *